United States Patent [19]
Cristante

[11] 3,844,319
[45] Oct. 29, 1974

[54] PUMP ATTACHABLE TO AN AUTOMOBILE EXHAUST

[76] Inventor: Ado Cristante, c/o Maiello 2547 Laconia Ave., Bronx, N.Y. 10469

[22] Filed: June 8, 1972

[21] Appl. No.: 261,000

[52] U.S. Cl.............. 141/38, 123/198 C, 152/416, 417/231, 137/223
[51] Int. Cl....................... B60c 23/10, F16k 15/20
[58] Field of Search....... 141/38; 417/231; 152/415, 152/416; 123/198 C

[56] References Cited
UNITED STATES PATENTS

| | | | |
|---|---|---|---|
| 956,592 | 5/1910 | Maxim | 123/198 C |
| 1,942,358 | 1/1934 | Grathwol | 417/231 X |
| 3,065,774 | 11/1962 | Grimes | 141/38 |
| 3,374,780 | 3/1968 | Shimazaki | 123/198 C |

*Primary Examiner*—Leon G. Machlin
*Attorney, Agent, or Firm*—Auslander & Thomas

[57] ABSTRACT

A simple emergency pump sleeve connectable to an automobile exhaust includes an opening acting as safety valve to a tire and protects the motor from back pressure stalling.

9 Claims, 6 Drawing Figures

PATENTED OCT 29 1974 3,844,319
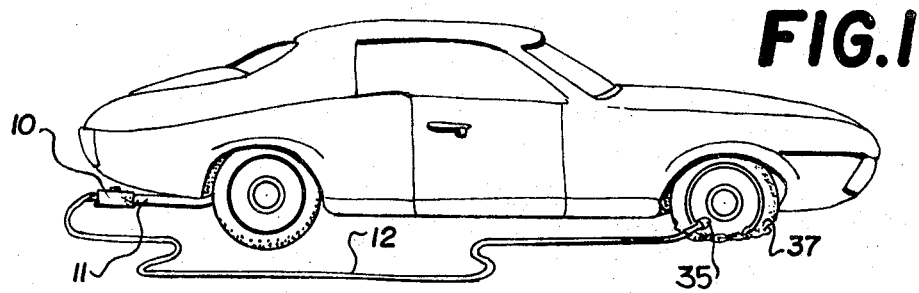
FIG.1
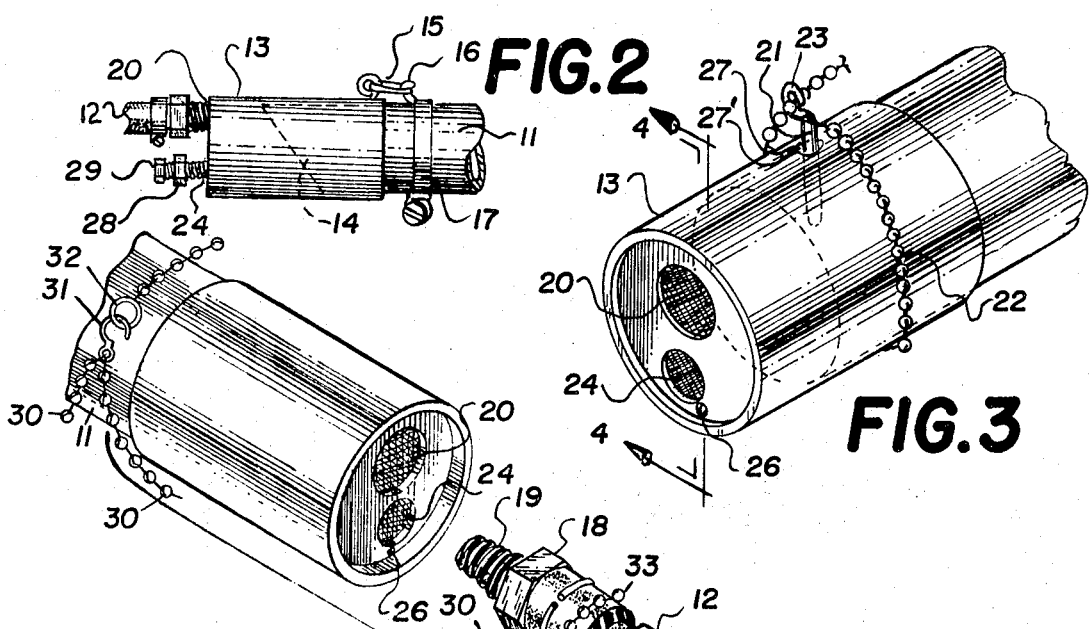
FIG.2
FIG.3
FIG.5
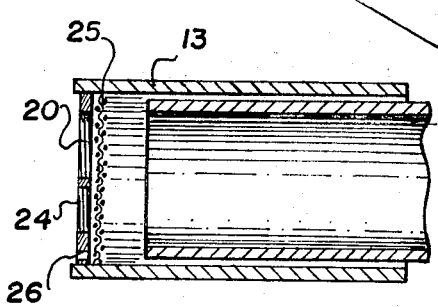
FIG.4
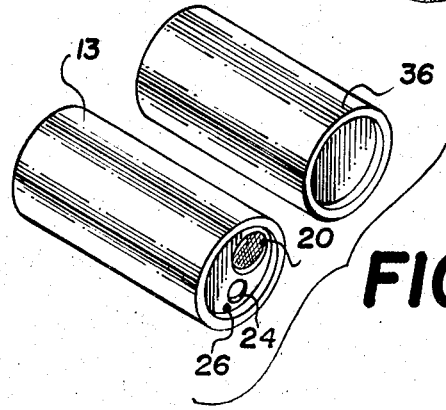
FIG.6

PUMP ATTACHABLE TO AN AUTOMOBILE EXHAUST

The present invention relates to a pump attachable to an automobile exhaust.

In particular, when a driver is alone on a road, a flat tire can be a worrysome thing. Devices of the past have been able to attach a coupling to an automobile engine or even its exhaust pipe so that a tire may be pumped up enough to drive to a haven.

Such devices of the past, working off an exhaust, have usually included some form of pressure gauge and some form of coupling to adapt to different size exhausts or some form of fixture to be permanently attached to the exhaust to hold the pump mechanism. Conventional filtering has been provided for as well as pressure regulating valves.

According to the present invention, a simple device is easily attached to an automobile exhaust and provides control over the pressure and inflation of a flat tire with an inexpensive mechanism.

Although such novel feature or features believed to be characteristic of the invention are pointed out in the claims, the invention and the manner in which it may be carried out may be further understood by reference to the description following and the accompanying drawings.

FIG. 1 is a general view of the automobile exhaust pump in use.

FIG. 2 is a partial side elevation of an exhaust coupling and the automobile exhaust pump of the present invention.

FIG. 3 is a partial isometric view of another exhaust coupling of the automobile exhaust pump of the present invention.

FIG. 4 is a section of FIG. 3 at lines 4 — 4.

FIG. 5 is an exploded view of the automobile exhaust pump of the present invention with the hose broken away.

FIG. 6 is an automobile exhaust pump of the present invention with a pair of sleeves for use with double exhaust engines.

Referring now to the figures in greater detail, where like reference numbers denote like parts in the various figures.

In FIG. 1, the automobile exhaust pump 10 is shown attached to an automobile exhaust 11 with the hose 12 connected to the valve (not shown) of a flat tire 37.

In FIG. 2 a typical exhaust coupling 13 or sleeve is attached to an exhaust pipe 11 having truncated end 14. In this instance, the coupling is held by a ring 15 attached to the coupling 13 and holding a hook 16 on a screw tightened band 17 attached to the exhaust 11.

As can best be seen in FIG. 5, the hose 12 is attached to a fitting 18 which includes a tapered screw end 19 which fits into the hose opening 20.

In FIG. 3, the exhaust coupling 13 is held in place by a pin 21 attached to chain 22 which may be wrapped around the exhaust coupling 13 and hooked to itself by the hook 23.

There is an exhaust opening 24 in the closed end of the exhaust coupling 13 of FIG. 3 as in all of the exhaust couplings 13 in the figures.

It is preferable that some form of screening 25 cover at least the hose opening 20. It may be simplest to cover both the exhaust opening 24 and hose opening 20 by a single screen inside the exhaust coupling 13 as can be seen in FIG. 4.

Since one of the combustion products of gasoline is water, it is preferable to have the hose opening 20 at the top of the exhaust coupling 13 and to have a drip hole 26 at its lowest point so that condensed water may drip free of the hose opening 20.

When using the exhaust coupling 13 of FIG. 3, it is necessary to have an opening 27 in the exhuast 11 and a mating opening 27' in the exhaust coupling 13.

In FIG. 2, the exhaust opening includes threads (not shown). In the exhaust coupling 13 a thread nut 28 with a hollow bore may be used to step down the size of the exhaust opening. The thread nut 28 may have an inner thread to accept a further smaller hollow bore nut 29 to further reduce the opening 24 of the exhaust coupling 13.

Exemplifying another mode of holding the exhaust coupling 13 to the exhaust, FIG. 5 shows a chain 30 encircling the exhaust 11 with a hook 31 holding a ring 32 and the chain 30 extended downward including a loop 33 through which the hose 12 and hose fitting 19 pass through.

The extreme end of the hose 12 has a conventional air valve 34, preferably including a self-locking fixture 35.

In FIG. 6 a dead end coupling 36 is provided so that double exhaust pipe systems can be blocked off to be able to get sufficient pressure for tire inflation.

In operation, the exhaust coupling 13 is affixed to the exhaust by any appropriate means.

The exhaust coupling 13 must fit quite snugly if pressure is to be obtained through the exhaust 11. While different sizes of exhaust coupling 13 must be provided for different models of cars, there are only a few basic sizes that are needed to cover most cars on the road today.

The exhaust coupling 13 is then attached to the exhaust by means already described or by other holding means combined on the exhaust coupling 13 and the exhaust 11, or on one or the other. The means shown are exemplary.

As shown in FIG. 2 the screw tightened band 17 may be applied and left on the exhaust 11 to await use.

As shown in FIG. 3, the exhaust must have a pre-cut opening 27. The chain 22 keeps the pin 21 from being blown out of the openings 27, 27' when there is pressure in the exhaust.

The exhaust coupling 13 as shown in FIG. 5 needs no prior preparation to the exhaust 11 and may be used as needed.

Since particles such as carbon are likely to be in the exhaust, the screen 25, preferably of some metal such as stainless steel is provided as a filter. Particles might foul the valve 34 on the hose 12 or the tire valve. The screen should be resistant to the acids and other exhaust products of a car.

The drip hole 26 lets water out from the lowest point in the exhaust coupling 13 and prevents fouling by the water and any dissolved contaminants.

The dead end 36 may be fastened to the second exhaust of a double exhaust car by the same means as the exhaust coupling 13.

The size of the exhaust opening 24 must be selected to act as a valve to set the maximum pressure the hose 12 can pump and to keep the pressure in the exhaust system low enough for the engine in a car not be stalled by the back pressure. These pressures can be determined by experience, calculation or from the specifications of the engine on all factors.

In order to adapt the modular exhaust coupling 13 to different models of cars such as where the exhaust 11 is the same diameter in a six cylinder car and an eight cylinder car, the openings for the the appropriate car may be selected by the use of threaded nuts 28, 29 or other simple means to set the aperture.

The hose 12 as illustrated in FIG. 5 is joined to the exhaust coupling 13 by a tapered screw 19, hose fitting 18. Any normal conventional means of attachment should suffice in order to have the hose 12 properly function.

An outstanding advantage of the present invention is with the self-locking fixture 35 as shown in FIG. 5. The hose may be attached as shown in FIG. 1 while a lone operator may rev the motor to pump through the hose.

The amount of filling depends upon how much the engine is revved. For a small pressure, only a small amount of revving need be used.

The exhaust opening 24 sets the upper limit as to the pressure that may go into a tire since there comes a point where the tire is full and the back pressure fills it no further.

It is often advantageous to pump a flat tire to a high pressure so that it will stay firm longer while it has more air to leak.

The terms and expressions which are employed are used as terms of description; it is recognized, though, that various modifications are possible.

Having thus described certain forms of the invention in some detail, what is claimed is:

1. An automobile exhaust pump conprising a sleeve adapted to fit snugly about the end of an automobile exhaust pipe; said sleeve including a closed end portion, an opening in said sleeve end portion including means to receive a hose fitting, a hose fitting, a hose attached to said hose fitting, an air pressure valve attached to said hose, an exhaust opening in said closed end portion; said opening of a size selected to maintain a pressure in said exhaust system when said automobile is operating low enough for said automobile engine to function and high enough to fill a tire, and a chain, one end of said chain adapted to be looped about said exhaust pipe and hold firm, the other end affixed to said sleeve and connected parts, all adapted to maintain said sleeve on said exhaust pipe.

2. The invention of claim 1 wherein said sleeve includes means to filter particles in said automobile exhaust.

3. The invention of claim 1 wherein said closed portion further includes means to drain said sleeve.

4. The invention of claim 1 wherein said hose includes a screw fitting and said hose fitting opening includes threads.

5. The invention of claim 1 wherein said air pressure valve includes a self-locking fixture.

6. The invention of claim 1 wherein said exhaust opening is adapted to receive means to reduce said opening.

7. The invention of claim 6 wherein said means to reduce said opening may receive further means to further reduce said opening.

8. The invention of claim 1 wherein said automobile includes two exhaust pipes, and a closed sleeve adapted to close one of said exhaust pipes.

9. An automobile exhaust pump comprising a sleeve adapted to fit snugly about the end of an automobile exhaust pipe; said sleeve including a closed end portion, an opening in said sleeve end portion including means to receive a hose fitting, a hose fitting, a hose attached to said hose fitting, an air pressure valve attached to said hose, an exhaust opening in said closed end portion; said opening of a size selected to maintain a pressure in said exhaust system when said automobile is operating low enough for said automobile engine to function and high enough to fill a tire, and said sleeve including an opening, said exhaust pipe including an opening, a pin, a chain on said pin, a hook on said chain, said pin adapted to fit in said openings secured by said chain about said sleeve secured by said hook.

* * * * *